United States Patent [19]
Milnes

[11] 3,871,854
[45] Mar. 18, 1975

[54] MANUFACTURE OF FLAT GLASS RIBBONS ON A MOLTEN METAL BATH

[75] Inventor: Harold Barry Milnes, Billinge, near Wigan, England

[73] Assignee: Pilkington Brothers Limited, Lancashire, England

[22] Filed: Oct. 24, 1973

[21] Appl. No.: 411,017

[30] Foreign Application Priority Data
Oct. 31, 1972 United Kingdom .............. 50170/72

[52] U.S. Cl. ................ 65/65 A, 65/99 A, 65/182 R
[51] Int. Cl. .......................................... C03b 18/02
[58] Field of Search ............... 65/65 A, 99 A, 182 R

[56] References Cited
UNITED STATES PATENTS

| | | | |
|---|---|---|---|
| 3,445,214 | 5/1969 | Ormesher | 65/65 A |
| 3,487,659 | 1/1970 | Ito et al. | 65/99 A |
| 3,647,408 | 3/1972 | Dickinson | 65/99 A |

*Primary Examiner*—Arthur D. Kellogg
*Attorney, Agent, or Firm*—Burns, Doane, Swecker & Mathis

[57] ABSTRACT

Float glass of thickness in the range 5.5 mm to 8 mm is manufactured under high load conditions at the rate of 3,250 to 4,500 tonnes per week and is discharged from the molten metal bath at speed in the range of 380 to 600 meters per hour, without undue loss of width, by laterally confining the edges of the molten glass layer as it is poured on to the bath to impose initial acceleration on the glass. The glass in ribbon form which is later permitted unconfined lateral movement is already advancing at high speed and is attenuated to its desired thickness by further acceleration to the high discharge speed.

10 Claims, 3 Drawing Figures

3,871,854

MANUFACTURE OF FLAT GLASS RIBBONS ON A MOLTEN METAL BATH

BACKGROUND OF THE INVENTION

This invention relates to the manufacture of flat glass by the float process in which molten glass is delivered at a controlled rate to a bath of molten metal and the glass is advanced in ribbon form along the bath and cooled as it is advanced to stabilise its dimensions when it reaches a desired width and thickness prior to discharge from the bath.

The need for meeting commercial requirements for float glass about 2.5 meters wide for glazing applications has necessitated increasing the speed at which the ribbon of glass is discharged from the bath. For example in operating high load plant with a throughput of glass of from 3,000 tonnes per week up to 4,500 tonnes per week the speed at which the glass is discharged from the bath may be as high as 500 or 600 meters per hour.

The resulting acceleration of the glass while it is still in a deformable state on the bath tends to cause undue reduction in ribbon width and thickness. This can be countered to some extent by increasing the rate of cooling of the glass as the ribbon is formed from molten glass at the hot end of the bath but too high a rate of cooling has been found to introduce undesirable distortions into the glass.

It has now been found that when producing float glass of thickness in the range 5.5 mm to 8 mm under high load conditions, an increase in the amount of hot end cooling is ineffective to retain the required width and thickness of the ribbon, and it is a main object of the present invention to provide an improved method of operating the float process under high load conditions for the production of float glass of thickness in the range 5.5 mm to 8 mm.

It is a further object of the invention to provide a method for the production of float glass of commercial 6 mm thickness and having a width of about 2.5 meters.

Another object of the invention is to produce float glass of thickness in the range 5.5 mm to 8 mm under high load conditions without using marginal edge rolls to control ribbon width, that is without roller markings on the selvedge of the ribbon.

SUMMARY

The invention provides a float glass manufacturing method and apparatus in which glass of thickness in the range 5.5 mm to 8 mm is produced in desired commercial widths, e.g. 2.5 m or 3.3 m, under high load conditions, that is a production throughput of from 3,250 to 4,500 tonnes per week, by pouring molten glass on to a molten metal bath and confining the glass laterally on the bath for an initial distance of its travel to enhance acceleration of the glass engendered by the traction at the outlet end of the bath which imparts to the ultimate ribbon a high discharge speed in excess of 380 meters per hour and up to 600 meters per hour. When unconstrained lateral movement of the edges of the ribbon is permitted following the lateral confinement, an initial ribbon is produced which is thicker than the ultimate ribbon and is already advancing at high speed so that there is not undue loss of width as the ribbon is further attenuated as it accelerates to its final high discharge speed.

BRIEF DESCRIPTION OF THE DRAWINGS

An embodiment of the invention will now be described, by way of example, with reference to the accompanying drawings, in which:

FIG. 3 is a section on line III—III of FIG. 1.

DESCRIPTION OF THE PREFERRED EMBODIMENTS

Figure 1:
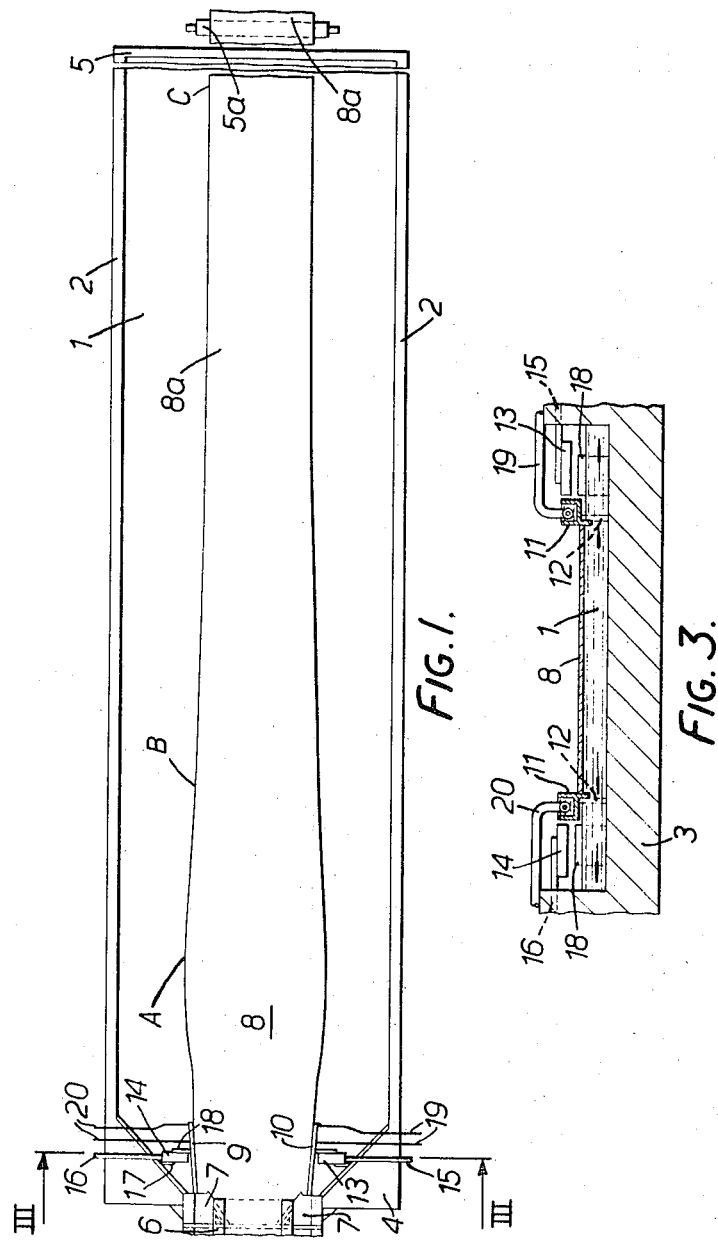
FIG. 1 is a plan view of a tank structure for use in the float process with the roof structure removed and showing the disposition of nonwettable fenders at the inlet end of the tank structure for laterally confining the molten glass poured on to the bath.
Figure 2:
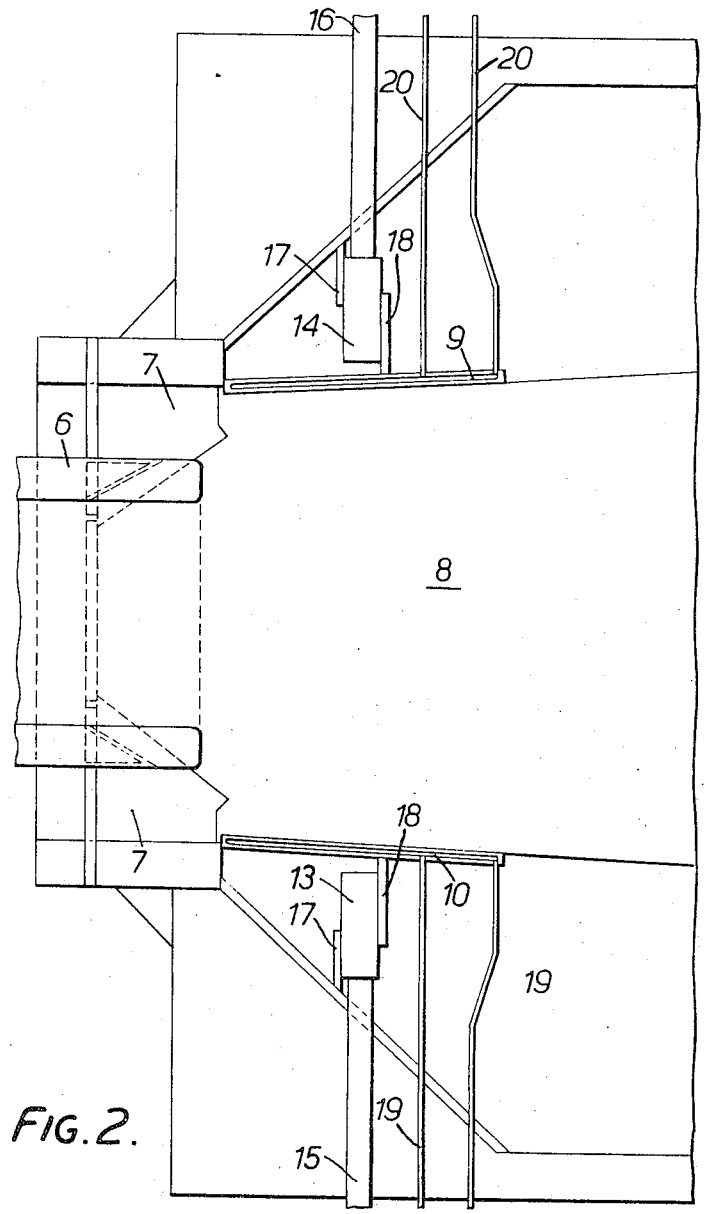
FIG. 2 is a plan view on an enlarged scale of the inlet end of the tank shown in FIG. 1.

A bath of molten metal, for example molten tin or a molten tin alloy in which tin predominates and having a specific gravity greater than glass, is indicated at 1. The molten metal bath is contained in an elongated tank structure formed by side walls 2, a floor 3 and end walls 4 and 5 respectively at the inlet and outlet ends of the tank structure.

A spout 6 extends over the inlet end wall 4 and is located in the middle region of that end wall and forms an extension of a forehearth of a glass melting furnace. A flow of molten glass over the lip of the spout is controlled by a tweel in known manner. At the inlet end of the tank structure there are mounted restricting walls 7 having splayed surfaces which are initially engaged by the molten glass arriving on the bath surface as it falls downwardly from the spout.

The molten glass arrives on the bath at a temperature of the order of 1,100°C and the glass at this high temperature flows forwardly to feed a layer of molten glass 8 advancing along the bath at the hot end which layer is laterally confined, as it is advanced, by fenders 9 and 10 extending down the bath for a short distance of about 2 meters. The fenders 9 and 10 are carbon fenders and, as shown in FIG. 3, each of the fenders has a hollow trough-shaped cross-section having a flat front face 11 which is engaged but not wetted by the edges of the layer of molten glass 8 advancing along the bath. Extending downwardly from each fender are short spacer legs 12 which are seated on the tank floor 3 and maintain the fenders spaced above the tank floor so as to ensure that the molten metal can be drawn from the centre towards the sides of the bath by linear induction motors 13 and 14 which are respectively mounted above the surface of the bath between the side walls 2 of the tank structure and the fenders 9 and 10. The linear induction motors 13 and 14 are mounted on support beams 15 and 16 which pass through the side walls 2 of the tank structure and maintain the lower faces of the motors just above the surface level of the bath. The motors are protected from the heat of the bath by refractory casings and supply pipes for cooling water to the windings of the motors, and the electrical connections to the motors are carried by the beams 15 and 16. Adjustment of the height of the lower faces of the motors above the surface of the bath adjusts the depth of penetration of the fields of the motors into the molten metal so as to control the flow of molten metal from beneath the layer of molten glass 8 and beneath the fenders 9 and 10 towards the sides of the bath. Baffle walls 17 and 18 are associated with the motors to direct the flows of molten metal drawn from beneath the layer of molten glass 8.

Each of the fenders 9 and 10 has a cooling pipe located in its internal trough and the cooling pipes are indicated at 19 and 20 in FIG. 3. Molten tin in the troughs acts as a thermal contact between the pipes 19 and 20 and the carbon of the fenders so that there is a high rate of cooling of the faces 11 of the fenders which are engaged by the glass to ensure the required non-wetting characteristics at the interface between the edges of the molten glass layer 8 and the fender faces 11.

The cooling pipes 19 and 20 are also employed to locate the fenders 9 and 10 in a slightly outwardly splayed location as illustrated. In the embodiment illustrated each of the fenders is inclined outwardly at an angle of 3° to the downstream direction of advance of the glass along the bath.

In conventional manner a roof structure is mounted over the tank structure and defines a headspace over the bath in which a protective atmosphere, for example 95 percent nitrogen and 5 percent hydrogen is maintained at a plenum. Some coolers are mounted in known manner, in the headspace over the ribbon of glass to assist in setting up a desired cooling regime for the advancing glass.

In the preferred method according to the invention which is illustrated by way of example, float glass of commercial 6 mm thickness is produced having a width of about 2.5 meters at a discharge speed of 480 meters per hour and at a load of 3,200 tonnes per week without any contact being made with the upper surfaces of the margins of the glass so that the annealed glass discharged to the warehouse has no roller markings on its upper margins and there is little wastage in the edge trimming of the ribbon.

The molten glass is poured from the sprout 6 on to the bath surface and fills up the space between the restrictor tiles 7 and flows forwardly feeding the upstream end of the laterally confined layer of molten glass 8. The glass in the layer 8 is subject to rapid acceleration which is enhanced by its lateral confinement, which acceleration is produced by the influence of the tractive effort transmitted upstream by the ultimate ribbon 8a from the outlet end of the bath, the ribbon being discharged from the bath by traction means in the form of rollers 5a in well known manner. The layer of glass has accelerated to a speed of 250 meters per hour just beyond the downstream end of the fenders 9 and 10 and the body of molten glass leaving the fenders has been set up to a thickness of about 9.5 mm. The glass in this region is at a temperature of about 1,020°C.

This glass which is moving forwardly at high speed and is still accelerating is at a viscosity such that lateral flow can take place and as shown in FIG. 1 there is some outward spreading of the glass, which has meanwhile been cooled, and in a short distance the glass spreads from a body which is 3 meters wide as it leaves the fenders 9 and 10 to a body 3.7 meters wide as it reaches the limit of its outward spreading at the location marked A. The glass temperature at this location is about 980°C and its thickness is about 7.65 mm. Starting with the ribbon of glass in this form, attenuation takes place to produce the ultimate ribbon 8a and the effect of the carbon fenders 9 and 10 at the hot end of the bath is to enable the spread molten glass to have achieved a width, thickness, forward velocity and viscosity state appropriate to the eventual production of a dimensionally stabilised ribbon of thickness 5.8 mm and width 2.5 meters which is discharged from the bath at a speed of 480 meters per hour. The initial ribbon which is set up on the bath is in the desired state at the location marked A and as the ribbon is being cooled its increased viscosity causes it to become influenced to a progressively greater degree by the tractive effort. By the time the glass reaches location B it is at a temperature of 925°C and its speed has accelerated to 278 meters per hour while its thickness and width are already decreasing.

Because the glass is already rapidly accelerating from a high speed as attenuation begins the desired thickness reduction is achieved without undue loss in width and as illustrated from location A to location C where the ultimate ribbon of glass 5.8 mm thick is stabilised at a temperature of about 880°C, a reduction in thickness of 39 percent has taken place while the reduction in width is only 13 percent and this is achieved with the edges of the advancing ribbon unconstrained on the bath so that the ribbon margins are not marred by roller marking and there is less wastage in the edge trimming of the glass than there is in processes when edge rolls are used.

In another run at a load of 4,500 tonnes per week, a ribbon 6 mm thick and 3.3 m wide was produced at a rate of 550 m/hr using fenders 9 and 10 which were up to 4 m long, for example 3.7 m long, and were splayed at an angle of 3° to the downstream direction of advance of the glass along the bath.

The method of the invention is applicable to float glass manufacture when the speed of discharge of the ribbon from the bath is greater than 380 meter per hour to accommodate high load operation. The speed of discharge of the ribbon from the bath may be in the range 380 to 500 meters per hour. The process can be employed for the production of glass of thickness in the range 5.5 mm to 8 mm.

The method is particularly effective for the production of commercial 6 mm glass which is generally within the tolerance limits of 5.8 mm to 6.2 mm, and of width in the range 2.4 meters to 3.3 meters to suit the requirements of warehousing and of customers for glass 3.3 meters (130 inches) or 2.5 meters (100 inches) wide. The differences in width within the stated ranges are achieved by varying the distance between the fenders 9 and 10 and the angle of splay of the fenders as well as the temperature gradient to which the advancing glass is subjected.

The invention thus provides an advantageous method for operating the float process for the production of commercial 6 mm glass at a width acceptable to commercial glazing standards and under high load operating conditions. Because moderate cooling only is necessary at the hot end of the bath and because no edge rolls are employed the glass so produced is well within the optical quality limits laid down in terms of distortion assessments and has the further advantage of being unmarked on its upper marginal surfaces by edge rolls by any other mechanical devices.

This is of advantage in meeting the requirements of glass merchants, the resulting glass being less subject to breakage, easier to stock and of greater sales potential in that the glass can be sold straight from the annealing lehr without edge trimming.

I claim:

1. A method of manufacturing flat glass in ribbon form of a desired thickness in the range 5.5 mm to 8 mm on a molten metal bath, comprising pouring molten glass onto the bath to forwardly feed a layer of molten glass advancing along the bath, imposing initial acceleration on the layer of molten glass by laterally confining the edges of that layer of molten glass adjacent the location of said pouring as the glass is advanced under the influence of tractive effort discharging the ribbon from the bath at a speed in the range 380 to 600 metres per hour thereby forming a laterally confined and accelerating body of molten glass of thickness greater than the desired thickness, and then, while the glass is at a viscosity which permits deformation and lateral movement and the glass is advancing at a speed in excess of about 250 metres per hour engendered by said tractive effort and said initial acceleration of the layer of molten glass enhanced by lateral confinement thereof, permitting unconstrained lateral movement of the edges of the advancing ribbon as the glass is attenuated to the desired thickness in said range by further acceleration to the high speed of discharge of the ribbon from the bath.

2. A method of manufacturing flat glass in ribbon form of a desired thickness in the range 5.8 mm to 8 mm on a molten metal bath, comprising pouring molten glass onto the bath at a rate in the range 3,250 to 4,500 tonnes per week to forwardly feed a layer of molten glass advancing along the bath, imposing acceleration on the layer of molten glass by laterally confining the edges of that layer of molten glass adjacent the location of said pouring as the glass is advanced under the influence of tractive effort discharging the ribbon from the bath at a high discharge speed in the range 380 to 600 metres per hour thereby forming a laterally confined and accelerating body of molten glass of thickness greater than the desired thickness, and then, while the glass is at a viscosity which permits deformation and lateral movement and the glass is advancing at a speed in excess of about 250 metres per hour engendered by said tractive effort and said initial acceleration of the layer of molten glass enhanced by lateral confinement thereof, permitting unconstrained lateral movement of the edges of the advancing ribbon as the glass is attenuated to the desired thickness in said range by further acceleration to the high discharge speed of the ribbon from the bath.

3. A method according to claim 2, of manufacturing flat glass in ribbon form of thickness in the range 5.8 mm to 6.2 mm and width in the range 2.4 m to 2.8 m, in which molten glass is poured on to the bath at a rate of 3,250 tonnes per week and the ultimate ribbon is discharged from the bath at a speed in the range 380 meters per hour to 500 meters per hour.

4. A method according to claim 3, of manufacturing a ribbon of glass of thickness in the range 5.8 mm to 6.2 mm and width in the range 2.4 m to 2.6 m, in which molten glass is poured on to the bath at the rate of 3,250 tonnes per week, and the ultimate ribbon is discharged from the bath at a speed of about 480 meters per hour.

5. A method according to claim 2, of manufacturing a ribbon of glass of thickness in the range 5.8 mm to 6.2 mm and width about 3.3 m, in which molten glass is poured on to the bath at the rate of 4,500 tonnes per week, and the ultimate ribbon is discharged from the bath at a speed of about 550 meters per hour.

6. Apparatus for manufacturing flat glass in ribbon form of thickness in the range 5.5 mm to 3 mm, comprising an elongated tank structure containing a bath of molten metal, means for delivering molten glass to one end of the tank structure under a forwardlly directed pressure head at a controlled rate to forwardly feed a layer of molten glass advancing along the bath, fenders disposed at opposite sides of the tank structure at said one end thereof for laterally confining the edges of the layer of molten glass adjacent the location of said delivering and imposing initial acceleration on the layer of molten glass advanced under the influence of traction, the fenders having faces for engagement by the glass of a material not wetted by the glass and being splayed at an angle of the order of three degrss to the downstream direction of advance of the glass along the bath, the fenders further having an extent short of a zone where the glass is at a viscosity which permits deformation and lateral movement of the glass advancing at a speed in excess of about 250 metres per hour engendered by said traction and the initial acceleration of the layer of molten glass enhanced by confinement thereof, and traction means at the other end of the tank structure for applying traction to the glass and discharging a ribbon of glass of desired thickness from the bath.

7. Apparatus as claimed in claim 6, wherein the length of the fenders along the bath is from 2 m to 4 m.

8. A method of manufacturing flat glass in ribbon form of a desired thickness in the range 5.5 mm to 8 mm on a molten metal bath comprising delivering molten glass under a forwardly directed pressure head onto the bath to forwardly feed a layer of molten glass advancing along the bath, imposing initial acceleration on the layer of molten glass by laterally confining the edges of the layer of molten glass adjacent the location of said delivering as the glass is advanced under the influence of tractive effort discharging the ribbon from the bath at a speed in the range 380 to 600 metres per hour thereby forming a laterally confined and accelerating body of molten glass of thickness greater than the desired thickness, and then, while the glass is at a viscosity which permits deformation and lateral movement and the glass is advancing at a speed in excess of about 9. A method of manufacturing flat glass in ribbon form of a desired thickness in the range 5.5 mm to 8 mm on a molten metal bath, the method comprising:
providing a flowing supply of molten glass at a predetermined mass flow rate;
establishing on the molten metal bath a forwardly directed layer of molten glass of thickness greater than the desired thickness and flowing at said predetermined mass flow rate, and into which layer said supply is delivered at said predetermined mass flow rate;
developing said flat glass in ribbon form from said forwardly flowing layer, which glass ribbon is continuously discharged from the bath at said mass flow rate by tractive effort applied to the ribbon;
laterally confining, for a distance along the bath adjacent the location of said delivering of said supply of molten glass into said layer, the edges of said forwardly directed layer of molten glass flowing at said predetermined mass flow rate;
terminating said lateral confinement while the glass is at a viscosity which permits deformation and lateral movement;

developing from the then unconfined glass a laterally spreading glass body, of thickness greater than said desired thickness, advancing at a speed in excess of about 250 metres per hour engendered by said tractive effort and lateral confinement of said molten glass layer; and thereafter attenuating the glass to said desired thickness by accelerating the glass to a speed in the range 380 to 600 metres per hour for continuous discharge from the bath at said mass flow rate.

10. A method of manufacturing flat glass in ribbon form of a desired thickness in the range 5.5 mm to 8 mm on a molten metal bath, the method comprising:

providing a flowing supply of molten glass at a predetermined mass flow rate in the range of 3,250 to 4,500 tonnes per week;

establishing on the molten metal bath a forwardly directed layer of molten glass of thickness greater than the desired thickness and flowing at said predeterminte mass flow rate, and into which layer said supply is delivered at said predetermined mass flow rate; developing said flat glass in ribbon form from said forwardly flowing layer, which glass ribbon is continuously discharged from the bath at said mass flow rate by tractive effort applied to the ribbon;

laterally confining, for a distance along the bath adjacent the location of said delivering of said supply of molten glass into said layer, the edges of said forwardly directed layer of molten glass flowing at said predetermined mass flow rate to impose an initial acceleration on said layer of molten glass;

terminating said lateral confinement while the glass is at a viscosity which permits deformation and lateral movement;

developing from the unconfined glass a laterally spreading glass body, of thickness greater than said desired thickness, advancing at a speed in excess of about 250 metres per hour engendered by said tractive effort and said initial acceleration of the layer of molten glass enhanced by the lateral confinement thereof; and thereafter attenuating the glass to said desired thickness by further accelerating the glass to a speed in the range 380 to 600 metres per hour for continuous discharge from the bath at said mass flow rate.

* * * * *

UNITED STATES PATENT OFFICE
CERTIFICATE OF CORRECTION

Patent No. 3,871,854　　　　　　Dated March 18, 1975

Inventor(s) Harold Barry Milnes

It is certified that error appears in the above-identified patent and that said Letters Patent are hereby corrected as shown below:

Column 6, line 45, after "about" insert the following:

--250 metres per hour engendered by said tractive effort and said initial acceleration of the layer of molten glass enhanced by the lateral confinement thereof, terminating said lateral confinement of the edges of the advancing ribbon as the glass is attenuated to the desired thickness in said range by further acceleration to the speed of discharge of the ribbon from the bath. --

Signed and sealed this 24th day of June 1975.

(SEAL)
Attest:

RUTH C. MASON
Attesting Officer

C. MARSHALL DANN
Commissioner of Patents
and Trademarks